(12) United States Patent
Khidekel (10) Patent No.: US 12,031,445 B2
(45) Date of Patent: Jul. 9, 2024

(54) VARIABLE AREA NOZZLE FOR AIRCRAFT PROPULSION SYSTEM

(71) Applicant: Rohr, Inc., Chula Vista, CA (US)

(72) Inventor: Ann Khidekel, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/688,419

(22) Filed: Mar. 7, 2022

(65) Prior Publication Data
US 2023/0279783 A1  Sep. 7, 2023

(51) Int. Cl.
| | | |
|---|---|---|
| F01D 17/14 | (2006.01) | |
| F01D 17/24 | (2006.01) | |
| F02K 1/12 | (2006.01) | |
| F02K 1/80 | (2006.01) | |
| F02K 1/11 | (2006.01) | |

(52) U.S. Cl.
CPC .......... *F01D 17/141* (2013.01); *F01D 17/24* (2013.01); *F02K 1/1207* (2013.01); *F02K 1/805* (2013.01); *F02K 1/11* (2013.01); *F02K 1/12* (2013.01)

(58) Field of Classification Search
CPC .......... F02K 1/1207; F02K 1/805; F02K 1/11; F02K 1/12; F01D 17/141; F01D 17/24
See application file for complete search history.

(56) References Cited

U.S. PATENT DOCUMENTS

| | | | | |
|---|---|---|---|---|
| 2,796,731 A | * | 6/1957 | Rubbra | F02K 1/123 239/455 |
| 3,622,075 A | * | 11/1971 | Harris | F02K 1/18 239/265.19 |
| 3,721,389 A | * | 3/1973 | Mackinnon | F02K 1/1207 239/265.19 |
| 3,892,358 A | * | 7/1975 | Gisslen | F02K 1/12 239/265.43 |
| 4,026,105 A | | 5/1977 | James | |
| 4,132,068 A | * | 1/1979 | Johnston | F02K 1/1207 239/265.39 |
| 5,076,496 A | * | 12/1991 | Lippmeier | F02K 1/805 239/265.41 |

(Continued)

OTHER PUBLICATIONS

EP Search Report for EP Patent Application No. 23160551.0 dated Jul. 7, 2023.

*Primary Examiner* — Andrew H Nguyen
(74) *Attorney, Agent, or Firm* — Getz Balich LLC (57) ABSTRACT

An apparatus is provided for an aircraft propulsion system. This apparatus includes a variable area nozzle apparatus. The variable area nozzle apparatus includes a plurality of panels, a plurality of inter-panel members and an actuation system. The panels are arranged circumferentially about an axial centerline. The panels include a first panel and a second panel. The inter-panel members are arranged circumferentially about the axial centerline. The inter-panel members include a first inter-panel member between and connected to the first panel and the second panel. The first inter-panel member is configured from or otherwise includes an elastomeric material. The actuation system is configured to move the panels and the inter-panel members between a restricted flow arrangement and an unrestricted flow arrangement. The actuation system includes a first linkage and a second linkage. The first linkage is coupled to the first panel. The second linkage is coupled to the second panel.

20 Claims, 11 Drawing Sheets

(56) References Cited

U.S. PATENT DOCUMENTS

| | | |
|---|---|---|
| 9,284,914 B2 | 3/2016 | Webster |
| 9,581,145 B2 | 2/2017 | Jasklowski |
| 9,850,776 B2 | 12/2017 | Hurlin |
| 2006/0053767 A1* | 3/2006 | Seiner ................... F02K 1/1223 60/204 |
| 2010/0000220 A1* | 1/2010 | Chaudhry ............. F01D 17/141 60/771 |
| 2013/0020408 A1* | 1/2013 | Jasklowski ............. F02K 1/763 239/265.11 |
| 2013/0306755 A1* | 11/2013 | Dittmann .............. F01D 17/141 239/265.39 |
| 2014/0338324 A1 | 11/2014 | Jasklowski |
| 2015/0000305 A1* | 1/2015 | Jasklowski ............... F02K 1/18 60/722 |
| 2016/0281639 A1* | 9/2016 | Jackowski ................ F02K 1/12 |

* cited by examiner

VARIABLE AREA NOZZLE FOR AIRCRAFT PROPULSION SYSTEM

BACKGROUND

1. Technical Field

This disclosure relates generally to an aircraft propulsion system and, more particularly, to a variable area nozzle apparatus for the aircraft propulsion system.

2. Background Information

An aircraft propulsion system may include a variable area nozzle apparatus (e.g., an exterior sleeve) to variably control flow area of an exhaust outlet from the aircraft propulsion system. Various types and configurations of variable area nozzle apparatuses are known in the art. While these known variable area nozzle apparatuses have various benefits, there is still room in the art for improvement. There is a need in the art therefore for an improved variable area nozzle apparatus.

SUMMARY OF THE DISCLOSURE

According to an aspect of the present disclosure, an apparatus is provided for an aircraft propulsion system. This propulsion system apparatus includes a variable area nozzle apparatus. The variable area nozzle apparatus includes a plurality of panels, a plurality of inter-panel members and an actuation system. The panels are arranged circumferentially about an axial centerline. The panels include a first panel and a second panel. The inter-panel members are arranged circumferentially about the axial centerline. The inter-panel members include a first inter-panel member between and connected to the first panel and the second panel. The first inter-panel member is configured from or otherwise includes an elastomeric material. The actuation system is configured to move the panels and the inter-panel members between a restricted flow arrangement and an unrestricted flow arrangement. The actuation system includes a first linkage and a second linkage. The first linkage is coupled to the first panel. The second linkage is coupled to the second panel.

According to another aspect of the present disclosure, another apparatus is provided for an aircraft propulsion system. This propulsion system apparatus includes a variable area nozzle apparatus. The variable area nozzle apparatus includes a plurality of panels and a plurality of inter-panel members. The panels are arranged circumferentially about an axial centerline. The panels include a first panel and a second panel. The inter-panel members are arranged circumferentially about the axial centerline. The inter-panel members include a first inter-panel member between and connected to the first panel and the second panel. The first inter-panel member is configured from or otherwise includes an elastomeric material. An outlet from the variable area nozzle apparatus is formed by a trailing edge of the first panel, a trailing edge of the second panel and a trailing edge of the first inter-panel member.

According to still another aspect of the present disclosure, another apparatus is provided for an aircraft propulsion system. This propulsion system apparatus includes a variable area nozzle apparatus. The variable area nozzle apparatus includes a plurality of panels, a plurality of inter-panel members and an actuation system. The panels are arranged circumferentially about an axial centerline. The panels include a first panel. Each of the inter-panel members is between and connected to a respective adjacent pair of the panels. Each of the inter-panel members is configured from or otherwise includes an elastomeric material. The actuation system is configured to move the variable area nozzle apparatus between a restricted flow arrangement and an unrestricted flow arrangement. The actuation system includes a first linkage coupled to the first panel at a location circumferentially between a respective adjacent pair of the plurality of inter-panel members.

The propulsion system apparatus may also include an actuation system configured to move the panels and the inter-panel members between a restricted flow arrangement and an unrestricted flow arrangement. The actuation system includes a first linkage and a second linkage. The first linkage is mounted to the first panel. The second linkage is mounted to the second panel.

A cross-sectional area of an outlet from the variable area nozzle apparatus may change as the panels and the inter-panel members move between the restricted flow arrangement and the unrestricted flow arrangement.

An outlet from the variable area nozzle apparatus may be formed by a trailing edge of the first panel and a trailing edge of the second panel.

The outlet from the variable area nozzle apparatus may also be formed by a trailing edge of the first inter-panel member.

The first inter-panel member may have a first sectional geometry when in the restricted flow arrangement. The first inter-panel member may have a second sectional geometry when in the unrestricted flow arrangement. The second sectional geometry may be different than the first sectional geometry.

The first inter-panel member may be configured to at least partially unfold as the first inter-panel member moves from the restricted flow arrangement to the unrestricted flow arrangement.

A circumferential width of the first inter-panel member may be configured to increase as the first inter-panel member moves from the restricted flow arrangement to the unrestricted flow arrangement.

The first inter-panel member may extend axially along the axial centerline between a first end and a second end. When in the unrestricted flow arrangement, a lateral width of the first inter-panel member at the first end may be different than a lateral width of the first inter-panel member at the second end.

At least a portion of the first panel may be configured for acoustic attenuation.

The first panel may be configured from or otherwise include a fiber-reinforced composite.

The first panel may include an inner skin, an outer skin and a cellular core between and connected to the inner skin and the outer skin.

The propulsion system apparatus may also include a support structure. Each of the panels may be pivotally coupled to the support structure.

The first panel may form a flowpath surface radially inside of the variable area nozzle apparatus.

The first panel may form a flowpath surface radially outside of the variable area nozzle apparatus.

The first inter-panel member may project radially out from the first panel and the second panel when in the restricted flow arrangement.

The first inter-panel member may project radially in from the first panel and the second panel when in the restricted flow arrangement.

The variable area nozzle apparatus may also include a plurality of outer panels and a plurality of outer inter-panel members. The outer panels may be arranged circumferentially about the axial centerline and radially outboard of the panels. The outer panels may include a first outer panel and a second outer panel. The outer inter-panel members may be arranged circumferentially about the axial centerline. The outer inter-panel members may include a first outer inter-panel member between and connected to the first outer panel and the second outer panel. The first outer inter-panel member may be configured from or otherwise include an elastomeric material.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
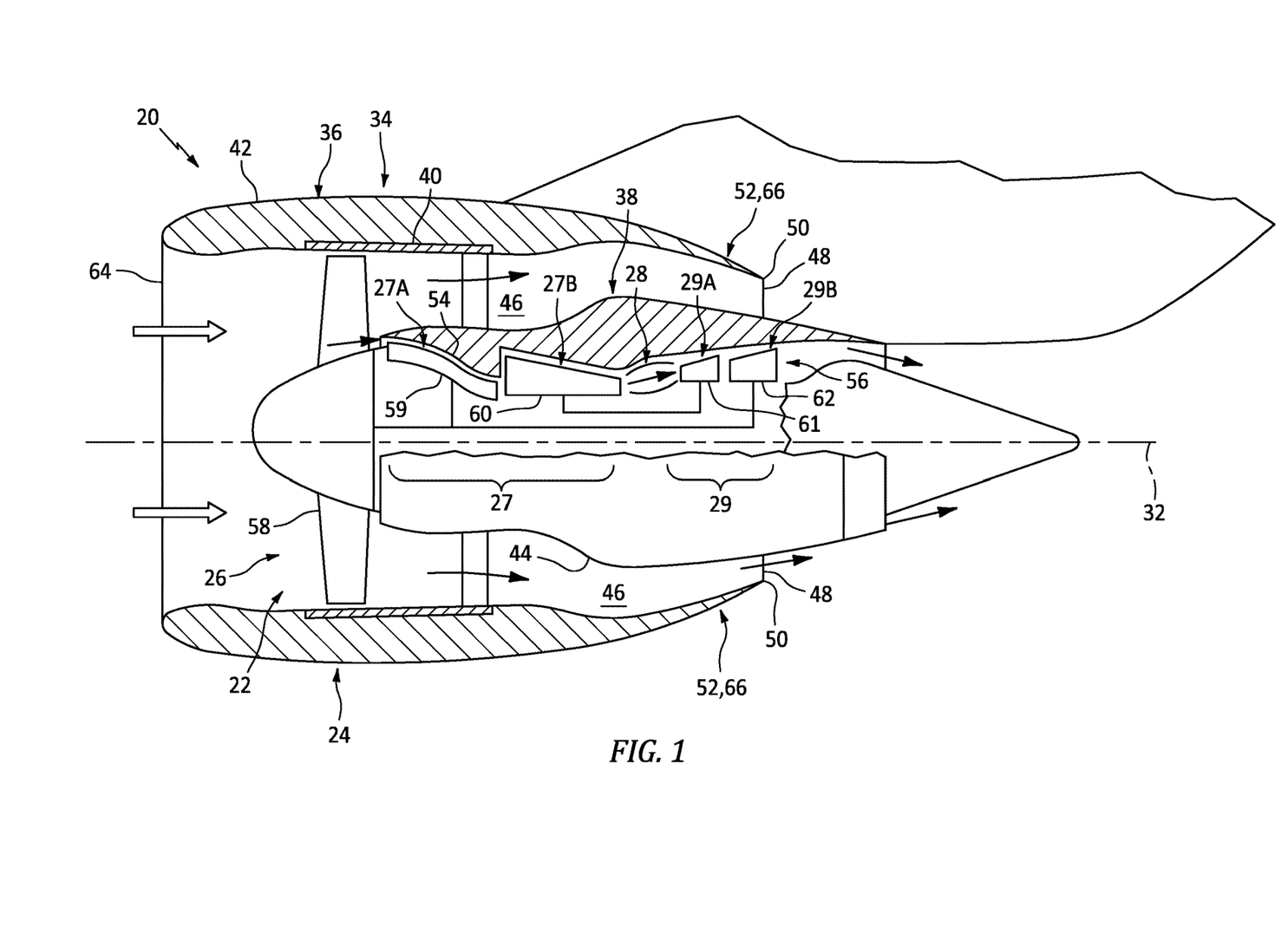
FIG. 1 is a side schematic cutaway illustration of an aircraft propulsion system.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 of FIG. 1 includes a low pressure compressor (LPC) section 27A and a high pressure compressor (HPC) section 27B. The turbine section 29 of FIG. 1 includes a high pressure turbine (HPT) section 29A and a low pressure turbine (LPT) section 29B.

The engine sections 26, 27A, 27B, 28, 29A and 29B are arranged sequentially along an axial centerline 32 (e.g., a rotational axis) of the gas turbine engine 22 within an aircraft propulsion system housing 34. This aircraft propulsion system housing 34 includes an outer housing structure 36 and an inner housing structure 38.

The outer housing structure 36 includes an outer case 40 (e.g., a fan case) and an outer structure 42 of the nacelle 24; i.e., an outer nacelle structure. The outer case 40 houses at least the fan section 26. The outer nacelle structure 42 houses and provides an aerodynamic cover for the outer case 40. The outer nacelle structure 42 also covers a portion of an inner structure 44 of the nacelle 24; i.e., an inner nacelle structure, which may also be referred to as an inner fixed structure. More particularly, the outer nacelle structure 42 axially overlaps and extends circumferentially about (e.g., completely around) the inner nacelle structure 44. The outer nacelle structure 42 and the inner nacelle structure 44 thereby at least partially or completely form a bypass flowpath 46. This bypass flowpath 46 extends axially along the centerline 32 within the aircraft propulsion system 20 to a bypass nozzle outlet 48. The bypass flowpath 46 is radially between the outer nacelle structure 42 and the inner nacelle structure 44. The bypass nozzle outlet 48 is at a trailing edge 50 of a bypass exhaust nozzle apparatus 52 (e.g., a sleeve), radially between the bypass exhaust nozzle apparatus 52 and the inner nacelle structure 44.

The inner housing structure 38 includes an inner case 54 (e.g., a core case) and the inner nacelle structure 44. The inner case 54 houses one or more of the engine sections 27A, 27B, 28, 29A and 29B, which engine sections 27A-29B may be collectively referred to as an engine core. The inner nacelle structure 44 houses and provides an aerodynamic cover for the inner case 54. A downstream/aft portion of the inner housing structure 38 such as, for example, a core nozzle of the inner nacelle structure 44 also covers at least a portion of an exhaust center body. A core flowpath 56 extends axially within the aircraft propulsion system 20, through the engine sections 27A-29B, to a core nozzle outlet at a trailing edge of the core nozzle.

Each of the engine sections 26, 27A, 27B, 29A and 29B of FIG. 1 includes a respective bladed rotor 58-62. Each of these bladed rotors 58-62 includes a plurality of rotor blades arranged circumferentially around and connected to one or more respective rotor disks.

The fan rotor 58 and the LPC rotor 59 are connected to and driven by the LPT rotor 62 through a low speed shaft. The HPC rotor 60 is connected to and driven by the HPT rotor 61 through a high speed shaft. The shafts are rotatably supported by a plurality of bearings (not shown). Each of these bearings is connected to the aircraft propulsion system housing 34 by at least one stationary structure such as, for example, an annular support strut.

During operation, air enters the aircraft propulsion system 20 through an airflow inlet 64. This air is directed through the fan section 26 and into the core flowpath 56 and the bypass flowpath 46. The air within the core flowpath 56 may be referred to as "core air". The air within the bypass flowpath 46 may be referred to as "bypass air".

The core air is compressed by the LPC rotor 59 and the HPC rotor 60 and directed into a combustion chamber of a combustor in the combustor section 28. Fuel is injected into the combustion chamber and mixed with the compressed core air to provide a fuel-air mixture. This fuel-air mixture is ignited and combustion products thereof flow through and sequentially cause the HPT rotor 61 and the LPT rotor 62 to rotate. The rotation of the HPT rotor 61 and the LPT rotor 62 respectively drive rotation of the HPC rotor 60 and the LPC rotor 59 and, thus, compression of the air received from a core airflow inlet. The rotation of the LPT rotor 62 also drives rotation of the fan rotor 58, which propels bypass air through the bypass flowpath 46 and out of the aircraft propulsion system 20 through the bypass exhaust nozzle apparatus 52 and its bypass nozzle outlet 48. The propulsion of the bypass air may account for a majority of thrust generated by the turbine engine 22, e.g., more than seventy-five percent (75%) of engine thrust. The aircraft propulsion system 20 of the present disclosure, however, is not limited to the foregoing exemplary thrust ratio. Furthermore, the aircraft propulsion system 20 of the present disclosure is not limited to the exemplary gas turbine engine configuration described above.

Figure 2A:
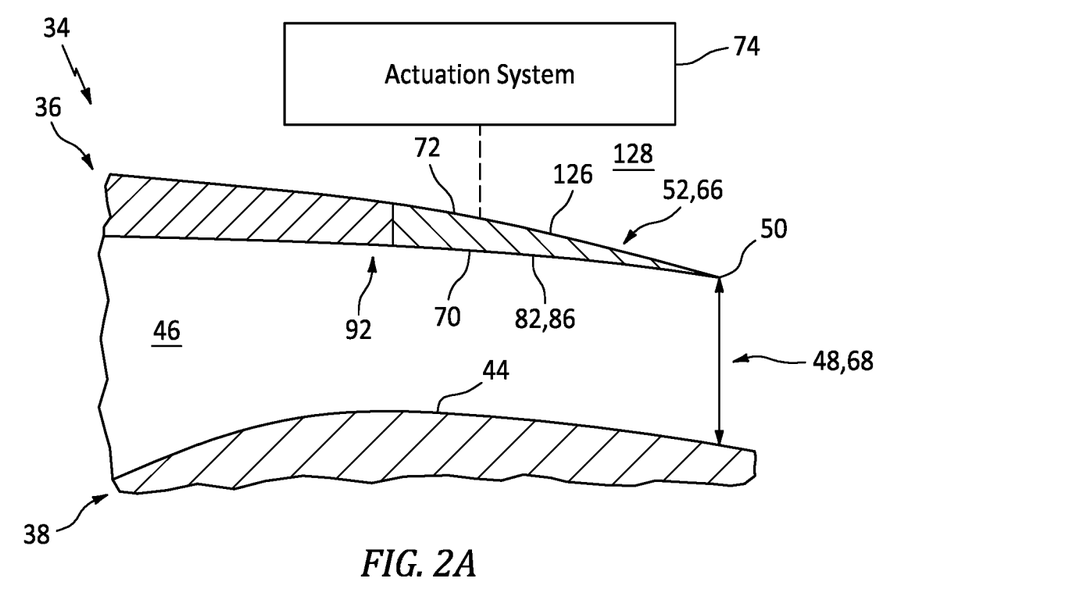
FIG. 2A is a side schematic sectional illustration of a portion of the aircraft propulsion system with a variable area nozzle apparatus in a restricted arrangement.
Figure 2B:
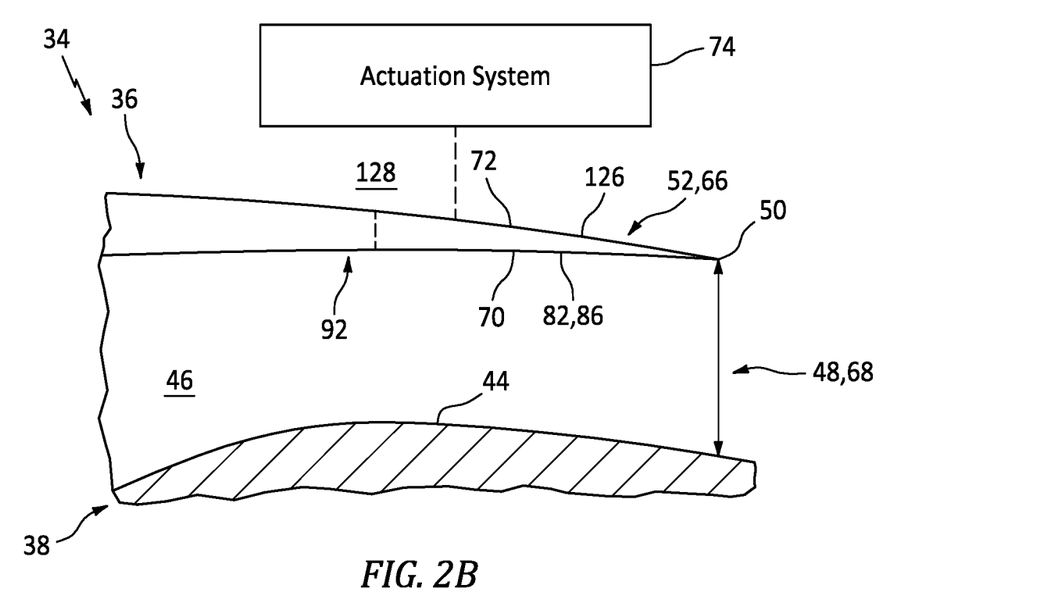
FIG. 2B is a side schematic sectional illustration of a portion of the aircraft propulsion system with the variable area nozzle apparatus in an unrestricted arrangement.

Under certain operating conditions, it may be beneficial to provide variability at the bypass exhaust nozzle apparatus 52 to enhance aircraft propulsion system operation; e.g., particularly as fan pressure ratios decrease and/or bypass pressure ratios increase. To provide such variability, the bypass exhaust nozzle apparatus 52 of FIGS. 2A and 2B is configured as a variable area nozzle (VAN) apparatus 66 (e.g., an external sleeve). This variable area nozzle apparatus 66 is configured to move between a restricted (or more restricted) flow arrangement of FIG. 2A and an unrestricted (or less restricted) flow arrangement of FIG. 2B. When the variable area nozzle apparatus 66 is in the restricted flow arrangement of FIG. 2A, a variable area nozzle (VAN) apparatus outlet 68 (here, the bypass nozzle outlet 48 of FIG. 1) has a first cross-sectional area (e.g., a restricted outlet area) in a first reference plane; e.g., a station plane. However, when the variable area nozzle apparatus 66 is in the unrestricted flow arrangement of FIG. 2B, the VAN apparatus outlet 68 has a second cross-sectional area (e.g., an unrestricted outlet area) in the first reference plane. This second cross-sectional area is greater than the first cross-sectional area. Movement of the variable area nozzle apparatus 66 from the restricted flow arrangement to the unrestricted flow arrangement thereby increases the outlet area of the VAN apparatus outlet 68.

Figure 3:
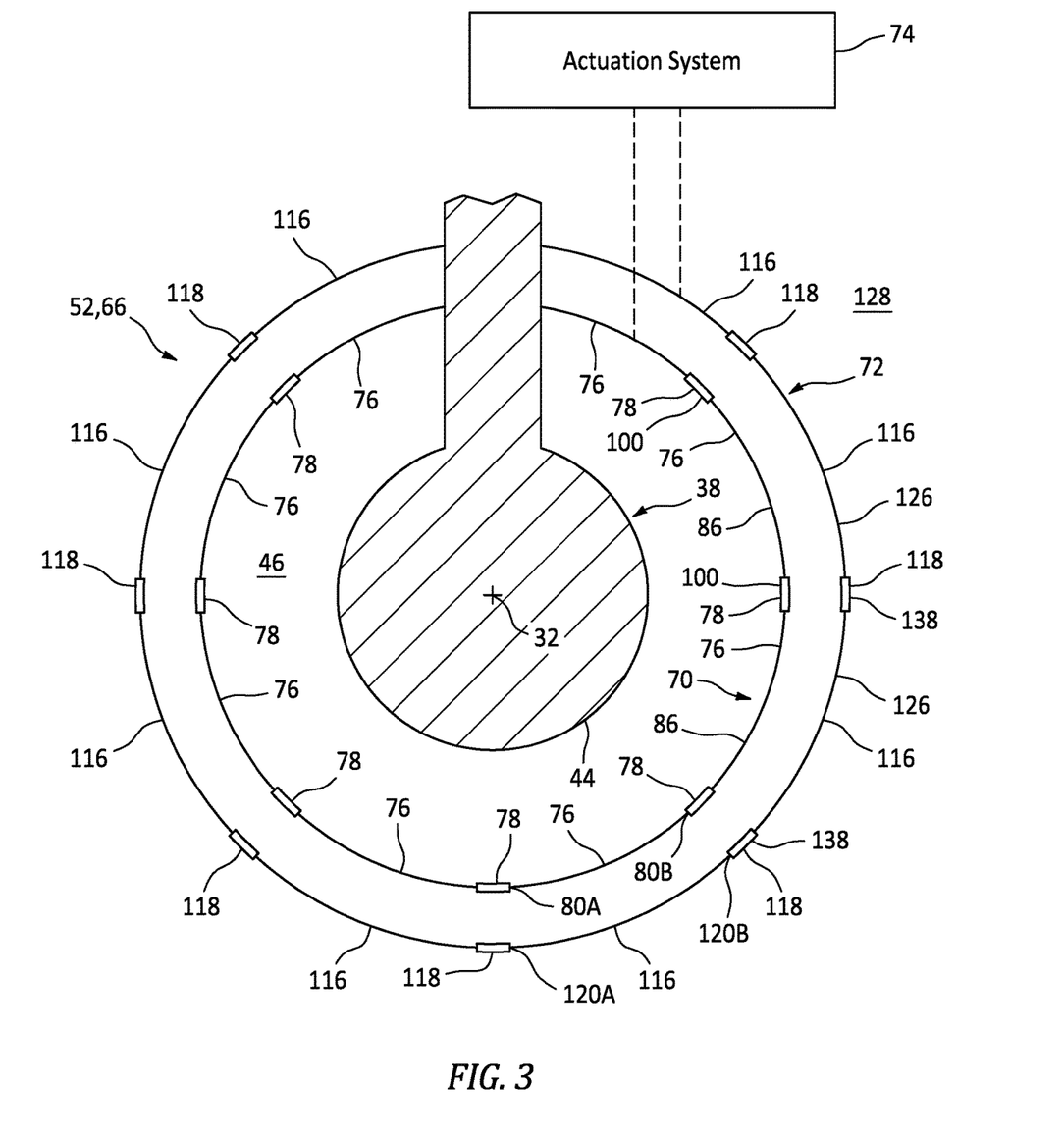
FIG. 3 is a schematic cross-sectional illustration of a portion of the aircraft propulsion system at the variable area nozzle apparatus.

The variable area nozzle apparatus 66 of FIG. 3 includes one or more variable nozzle skins 70 and 72. This variable area nozzle apparatus 66 also includes an actuation system 74 for moving the variable nozzle skins 70 and 72.

Figure 4:
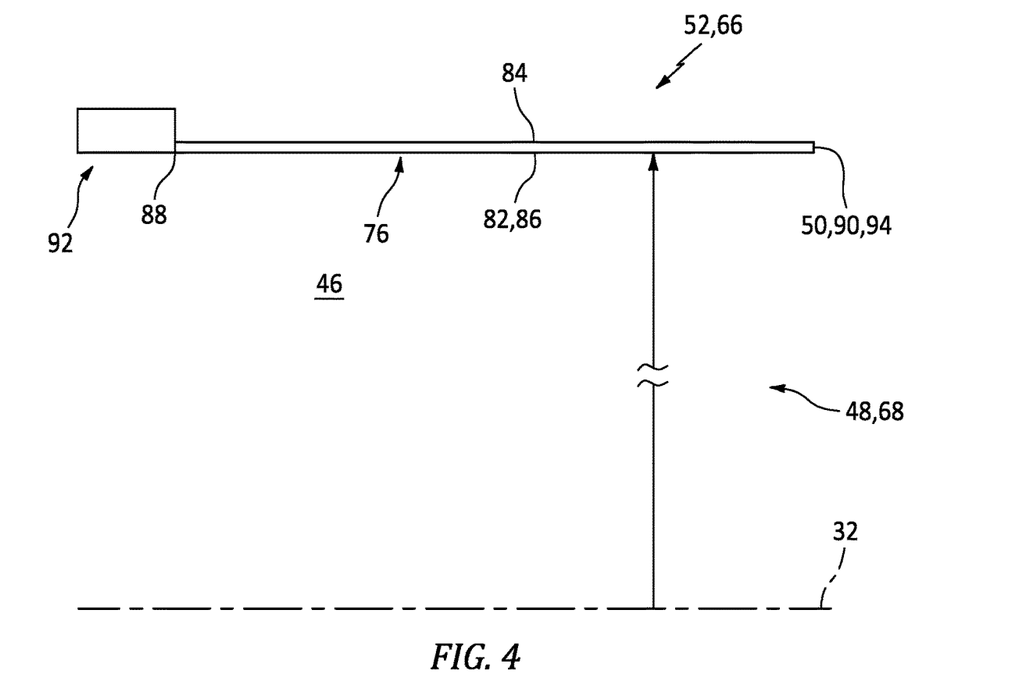
FIG. 4 is a side schematic sectional illustration of an inner skin panel coupled with a support structure.

The inner skin 70 of FIG. 3 includes a plurality of inner skin panels 76 (e.g., inner nozzle panels) and a plurality of inner skin inter-panel members 78; e.g., seals, connectors, deformable panels, etc. The inner skin panels 76 are arranged (e.g., in a side-by-side fashion) circumferentially about the centerline 32 in an array; e.g., an arcuate and/or substantially circular array. Each of the inner skin panels 76 extends laterally (e.g., circumferentially) between and to a first side 80A of the respective inner skin panel 76 and a second side 80B of the respective inner skin panel 76. Referring to FIG. 4, each of the inner skin panels 76 has a thickness which extends (e.g., radially) between a radial inner surface 82 of the respective inner skin panel 76 and a radial outer surface 84 of the respective inner skin panel 76. Here, the inner surface 82 forms a flowpath surface 86 radially inside of the variable area nozzle apparatus 66. For example, referring to FIG. 3, at least the flowpath surfaces 86 collectively form a radial outer peripheral boundary of the bypass flowpath 46 within the variable area nozzle apparatus 66. Referring again to FIG. 4, each of the inner skin panels 76 extends longitudinally (e.g., axially along the centerline 32) between and to a forward, upstream end 88 of the respective inner skin panel 76 and an aft, downstream end 90 of the respective inner skin panel 76. Each inner skin panel 76 is aft, downstream of and moveably (e.g., pivotally) coupled to a (e.g., fixed) support structure 92 at (e.g., on, adjacent or proximate) its upstream end 88. Each inner skin panel 76 partially forms the VAN apparatus outlet 68 at its downstream end 90; e.g., a trailing edge 94 of the respective inner skin panel 76.

Figure 6A:
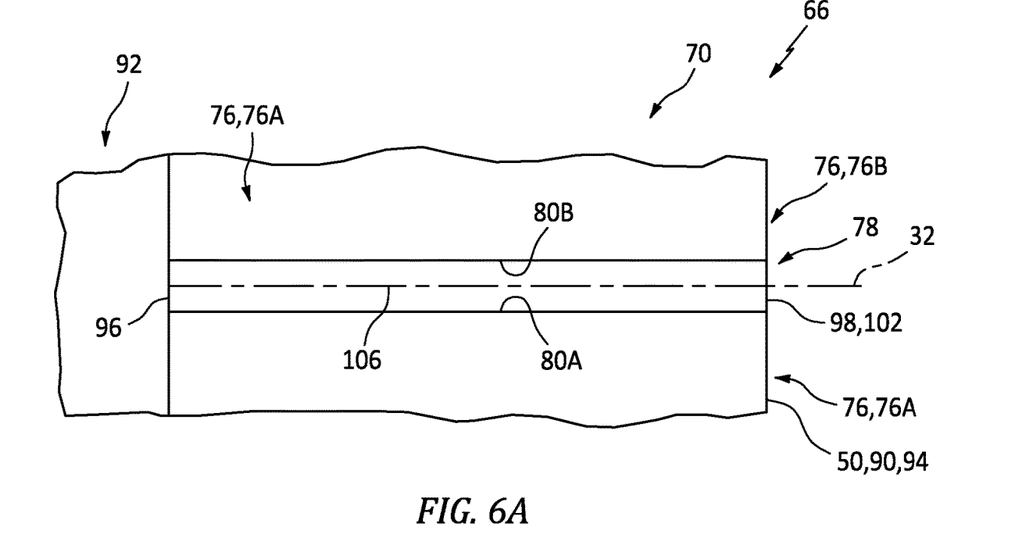
FIG. 6A is an illustration of an inner skin inter-panel member between adjacent inner skin panels and with the support member where the variable area nozzle apparatus is in the restricted arrangement.
Figure 6B:
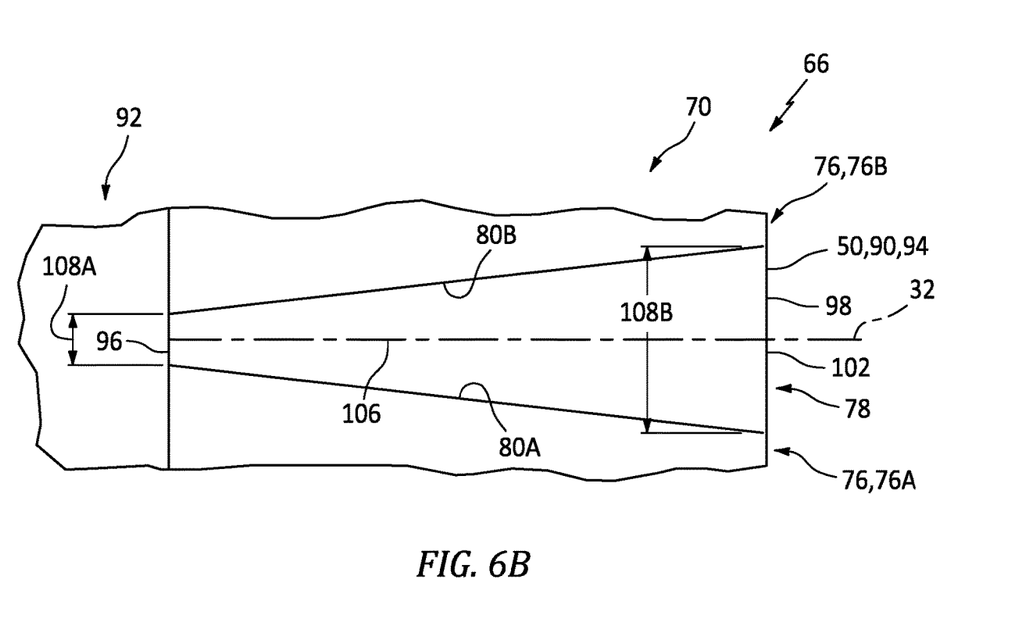
FIG. 6B is an illustration of the inner skin inter-panel member between adjacent inner skin panels and with the support member where the variable area nozzle apparatus is in the unrestricted arrangement.
Figure 7:
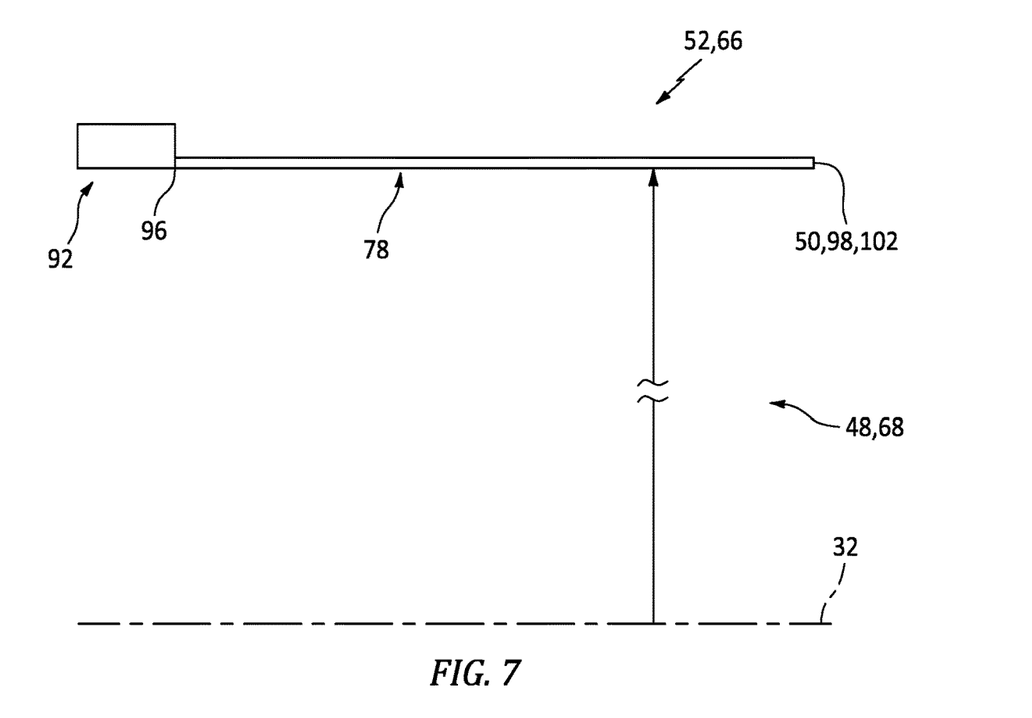
FIG. 7 is a side schematic sectional illustration of the inner skin inter-panel member coupled with the support structure.

The inner skin inter-panel members 78 of FIG. 3 are arranged circumferentially about the centerline 32 in an array, where the inner skin inter-panel members 78 are interposed with the inner skin panels 76. More particularly, referring to FIGS. 5A and 5B, each of the inner skin inter-panel members 78 is arranged laterally between a respective adjacent (e.g., neighboring) pair of the inner skin panels 76. Each inner skin inter-panel member 78 is also connected to the respective laterally adjacent pair of the inner skin panels 76; e.g., each laterally adjacent inner skin panel 76. Referring to FIGS. 6A and 6B, each inner skin inter-panel member 78 may extend longitudinally along a length of the laterally adjacent inner skin panels 76 between and to a forward, upstream end 96 of the respective inner skin inter-panel member 78 and an aft, downstream end 98 of the respective inner skin inter-panel member 78. Each inner skin inter-panel member 78 may thereby substantially or completely bridge, seal off, plug and/or otherwise fill a gap between the respective laterally adjacent pair of the inner skin panels 76. When the variable area nozzle apparatus 66 is in at least the unrestricted flow arrangement of FIG. 5B, each inner skin inter-panel member 78 may form a flowpath surface 100 radially inside of the variable area nozzle apparatus 66. Referring to FIG. 3, these flowpath surfaces 100 may further collectively form the radial outer peripheral boundary of the bypass flowpath 46 within the variable area nozzle apparatus 66. Referring to FIG. 7, each inner skin inter-panel member 78 also partially forms the VAN apparatus outlet 68 at the downstream end 98 of the respective inner skin inter-panel member 78; e.g., a trailing edge 102 of the respective inner skin inter-panel member 78.

Figure 5A:
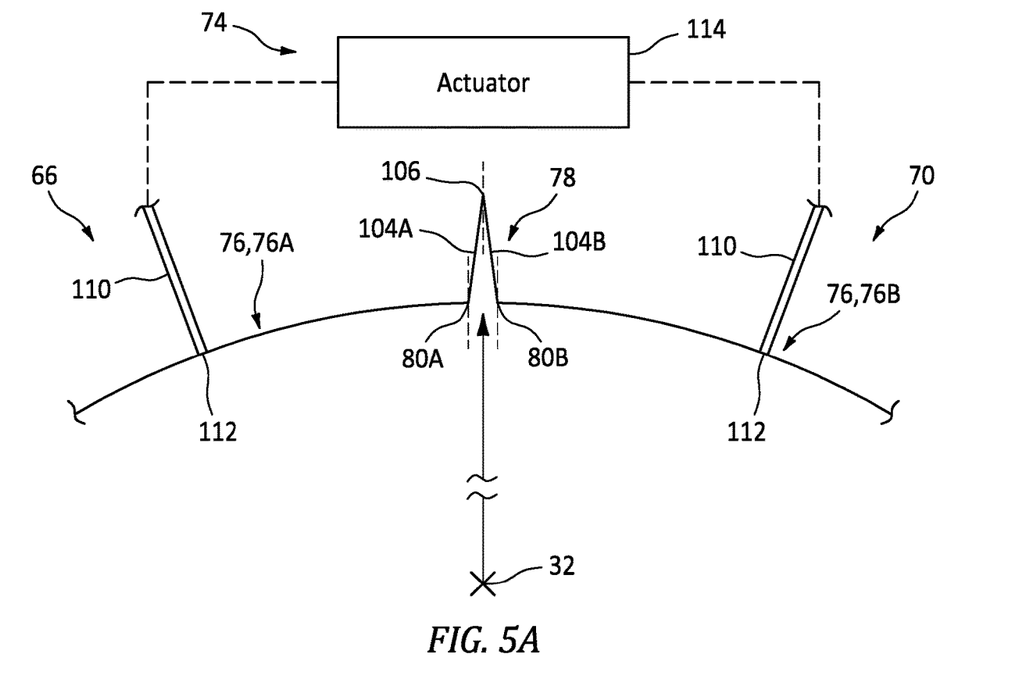
FIG. 5A is a schematic cross-sectional illustration of a portion of an inner skin where the variable area nozzle apparatus is in the restricted arrangement.
Figure 5B:
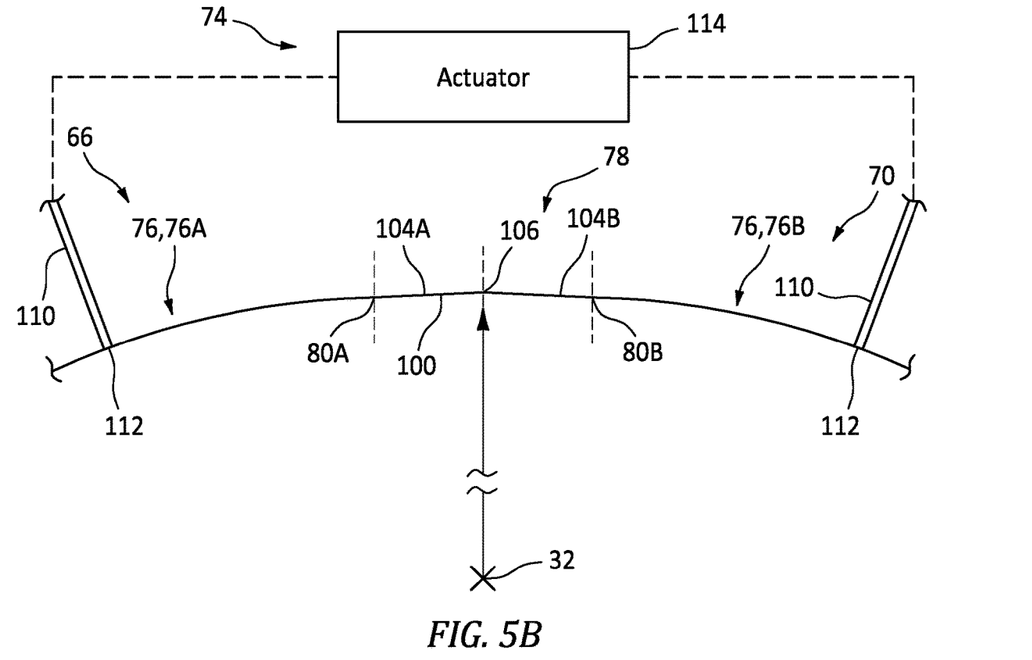
FIG. 5B is a schematic cross-sectional illustration of a portion of the inner skin where the variable area nozzle apparatus is in the unrestricted arrangement.

Referring to FIGS. 5A and 5B, each of the inner skin inter-panel members 78 is configured to unfold, hinge and/or otherwise deform as the variable area nozzle apparatus 66 moves from its restricted flow arrangement (see FIG. 5A) to its unrestricted flow arrangement (see FIG. 5B). Each inner skin inter-panel member 78, for example, may be configured from or otherwise include a flexible material such as, but not limited to, an elastomeric material; e.g., rubber, etc.

In the restricted flow arrangement of FIG. 5A, each inner skin inter-panel member 78 is folded such that a first portion 104A of the respective inner skin inter-panel member 78 radially and longitudinally is next to a second portion 104B of the respective inner skin inter-panel member 78. The inner skin inter-panel member first portion 104A is connected to a first of the inner skin panels (e.g., 76A). This inner skin inter-panel member first portion 104A projects (e.g., in a radial outward direction) out from the first inner skin panel 76A to an intermediate location 106 (or region) of the respective inner skin inter-panel member 78. The inner skin inter-panel member second portion 104B is connected to a second of the inner skin panels (e.g., 76B). This inner skin inter-panel member second portion 104B projects (e.g., in the radial outward direction) out from the second inner skin panel 76B to the intermediate location 106 (or region). The inner skin inter-panel member portions 104A and 104B meet one another at the intermediate location 106. The inner skin inter-panel member 78, for example, projects radially outward from the respective inner skin panels 76 to the intermediate location 106; e.g., a radial outboard edge. The inner skin inter-panel member 78 of FIG. 5A may thereby have a V-shaped or U-shaped cross-sectional geometry when viewed in a second reference plane, for example, perpendicular to the centerline 32.

In the unrestricted flow arrangement of FIG. 5B, each inner skin inter-panel member 78 is at least partially or completely unfolded. The inner skin inter-panel member first portion 104A of FIG. 5B, for example, projects laterally (e.g., not radially, or vary little radially) to the intermediate location 106. The inner skin inter-panel member second portion 104B similarly projects laterally (e.g., not radially, or vary little radially) to the intermediate location 106. The intermediate location 106, for example, may be radially aligned with the laterally adjacent inner skin panels 76. The inner skin inter-panel member first portion 104A and the inner skin inter-panel member second portion 104B may thereby extend substantially along a common arcuate reference line with the first inner skin panel 76 and the second inner skin panel 76. Thus, the inner skin inter-panel member 78 of FIG. 5B may have an arcuate cross-sectional geometry when viewed in the second reference plane, which is a different cross-sectional geometry than when in the restricted flow arrangement of FIG. 5A.

As the inner skin 70 moves from the restricted flow arrangement of FIG. 5A to the unrestricted flow arrangement of FIG. 5B, a circumferential width of each inner skin inter-panel member 78 (e.g., at the downstream end or another reference point) increases. To facilitate this increase in the circumferential width, each inner skin inter-panel member 78 may be tapered as shown in FIG. 6B. A lateral width 108A of the inner skin inter-panel member 78 of FIG. 6B at its upstream end 96, for example, is smaller than a lateral width 108B of the inner skin inter-panel member 78 of FIG. 6B at its downstream end 98. This inner skin inter-panel member 78 of FIG. 5B thereby laterally tapers as the inner skin inter-panel member 78 extends longitudinally from its downstream end 98 to its upstream end 96.

Figure 5C:
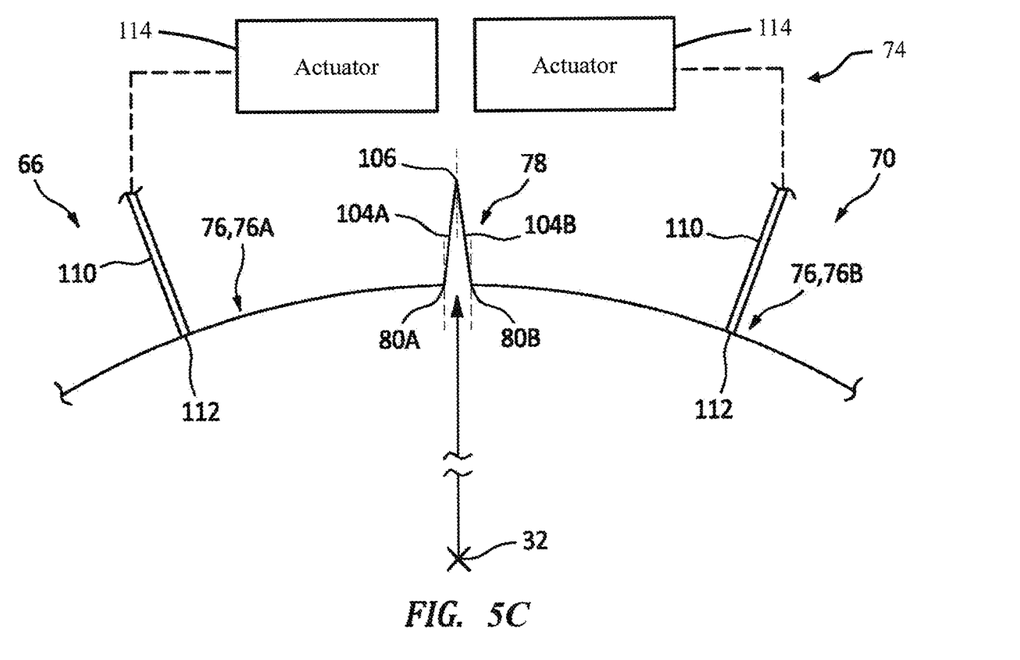
FIG. 5C is a schematic cross-sectional illustration of a portion of the inner skin where the variable area nozzle apparatus is in the restricted arrangement with another actuation system configuration.
Figure 5D:
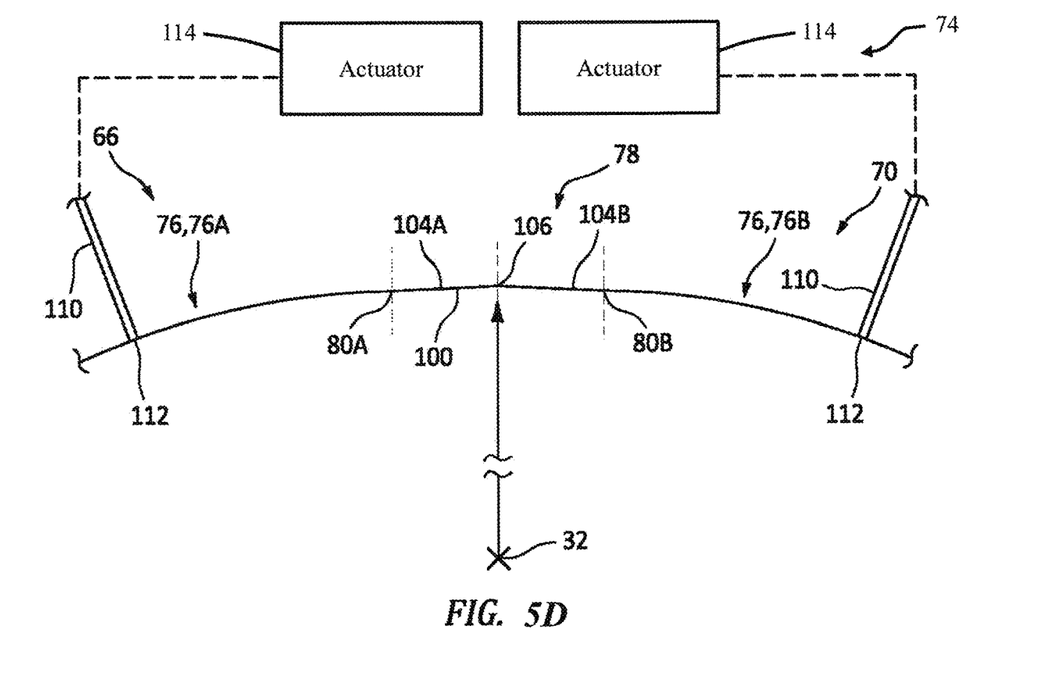
FIG. 5D is a schematic cross-sectional illustration of a portion of the inner skin where the variable area nozzle apparatus is in the unrestricted arrangement with the other actuation system configuration.

Referring to FIGS. 2A and 2B, the actuation system 74 is configured to move the inner skin 70 by pivoting its inner skin panels 76 (see FIG. 3) radially inwards and radially outwards. The actuation system 74 of FIGS. 5A and 5B, for example, includes a plurality of inner linkages 110; e.g., arms, struts, links, etc. Each of these inner linkages 110 is mounted to a respective one of the inner skin panels 76. An end 112 of each inner linkage 110, for example, may be pivotally coupled to the respective inner skin panel 76 at a coupling location. This coupling location may be located intermediately (e.g., midway) between the sides 80A and 80B of the respective inner skin panel 76 and the connected inner skin inter-panel members 78. Another end of each inner linkage 110 may be motively coupled to an inner actuator 114; e.g., a motor, a linear actuator, etc. Referring to FIGS. 5C and 5D, each of the inner linkages 110 may be associated with its own respective inner actuator 114. Alternatively, referring again to FIGS. 5A and 5B, one inner actuator 114 may be motively coupled to some or all of the inner linkages 110; e.g., through an intermediate coupling, etc. The present disclosure, however, is not limited to any particular actuation system configurations for moving the inner skin 70.

Figure 8:
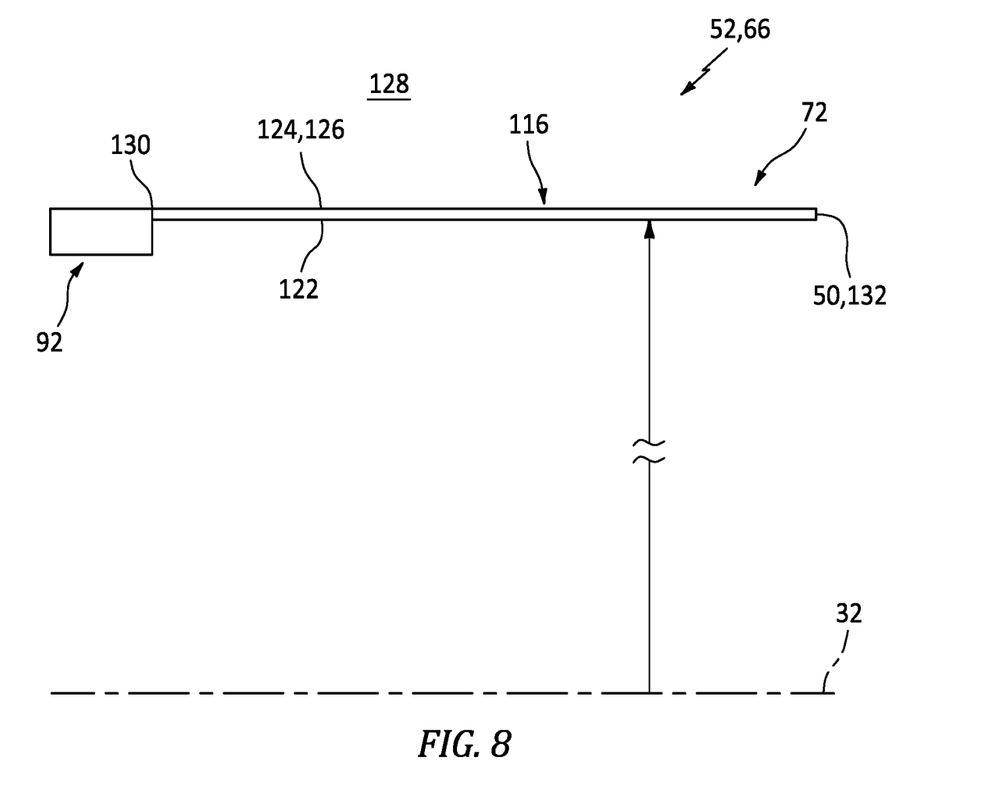
FIG. 8 is a side schematic sectional illustration of an outer skin panel coupled with the support structure.

The outer skin 72 of FIG. 3 includes a plurality of outer skin panels 116 (e.g., outer nozzle panels) and a plurality of outer skin inter-panel members 118; e.g., seals, connectors, deformable panels, etc. The outer skin panels 116 are arranged (e.g., in a side-by-side fashion) circumferentially about the centerline 32 in an array; e.g., an arcuate and/or substantially circular array. Each of the outer skin panels 116 extends laterally (e.g., circumferentially) between and to a first side 120A of the respective outer skin panel 116 and a second side 120B of the respective outer skin panel 116. Referring to FIG. 8, each of the outer skin panels 116 has a thickness which extends (e.g., radially) between a radial inner surface 122 of the respective outer skin panel 116 and a radial outer surface 124 of the respective outer skin panel 116. Here, the outer surface 124 forms a flowpath surface 126 radially outside of the variable area nozzle apparatus 66. For example, referring to FIG. 3, at least the flowpath surfaces 126 collectively form a radial inner peripheral boundary of an exterior flowpath 128 around and outside of the variable area nozzle apparatus 66. Referring again to FIG. 8, each of the outer skin panels 116 extends longitudinally (e.g., axially along the centerline 32) between and to a forward, upstream end 130 of the respective outer skin panel 116 and an aft, downstream end 132 of the respective outer skin panel 116. Each outer skin panel 116 is aft, downstream of and moveably (e.g., pivotally) coupled to the support structure 92 at (e.g., on, adjacent or proximate) its upstream end 130.

The outer skin inter-panel members 118 of FIG. 3 are arranged circumferentially about the centerline 32 in an array, where the outer skin inter-panel members 118 are interposed with the outer skin panels 116. More particularly, referring to FIGS. 9A and 9B, each of the outer skin inter-panel members 118 is arranged laterally between a respective adjacent (e.g., neighboring) pair of the outer skin panels 116. Each outer skin inter-panel member 118 is also connected to the respective laterally adjacent pair of the outer skin panels 116; e.g., each laterally adjacent outer skin panel 116. Referring to FIGS. 10A and 10B, each outer skin inter-panel member 118 may extend longitudinally along a length of the laterally adjacent outer skin panels 116 between and to a forward, upstream end 134 of the respective outer skin inter-panel member 118 and an aft, downstream end 136 of the respective outer skin inter-panel member 118. Each outer skin inter-panel member 118 may thereby substantially or completely bridge, seal off, plug and/or otherwise fill a gap between the respective laterally adjacent pair of the outer skin panels 116. When the variable area nozzle apparatus 66 is in at least the unrestricted flow arrangement of FIG. 9B, each outer skin inter-panel member 118 may form a flowpath surface 138 radially outside of the variable area nozzle apparatus 66. Referring to FIG. 3, these flowpath surfaces 138 may further collectively form the radial inner peripheral boundary of the exterior flowpath 128 outside of the variable area nozzle apparatus 66.

Figure 9A:
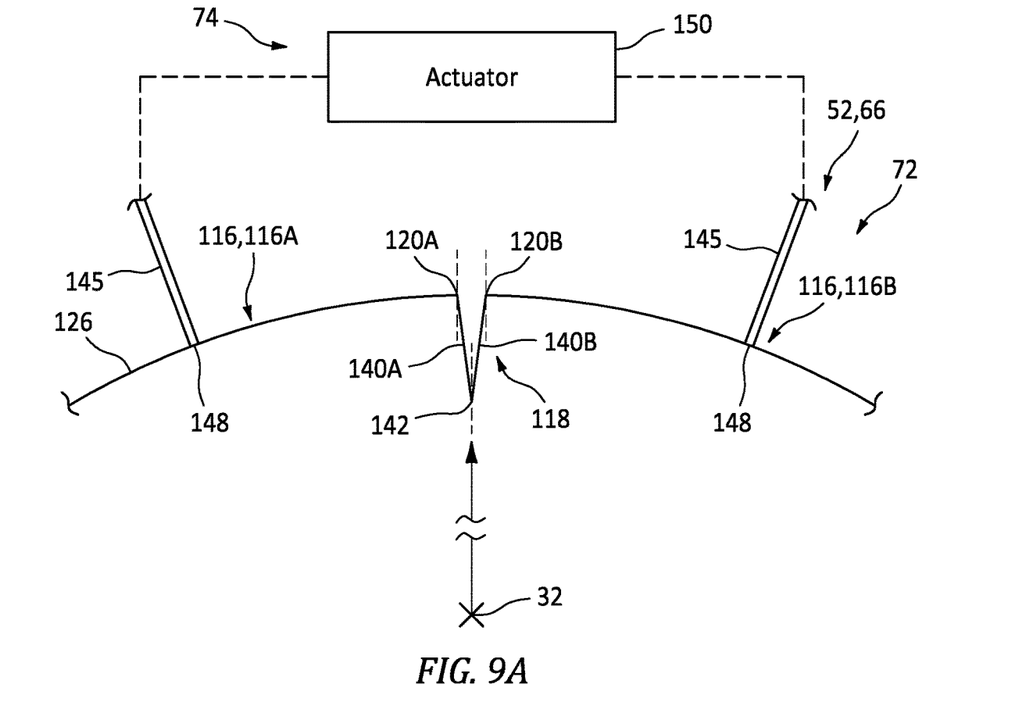
FIG. 9A is a schematic cross-sectional illustration of a portion of an outer skin where the variable area nozzle apparatus is in the restricted arrangement.
Figure 9B:
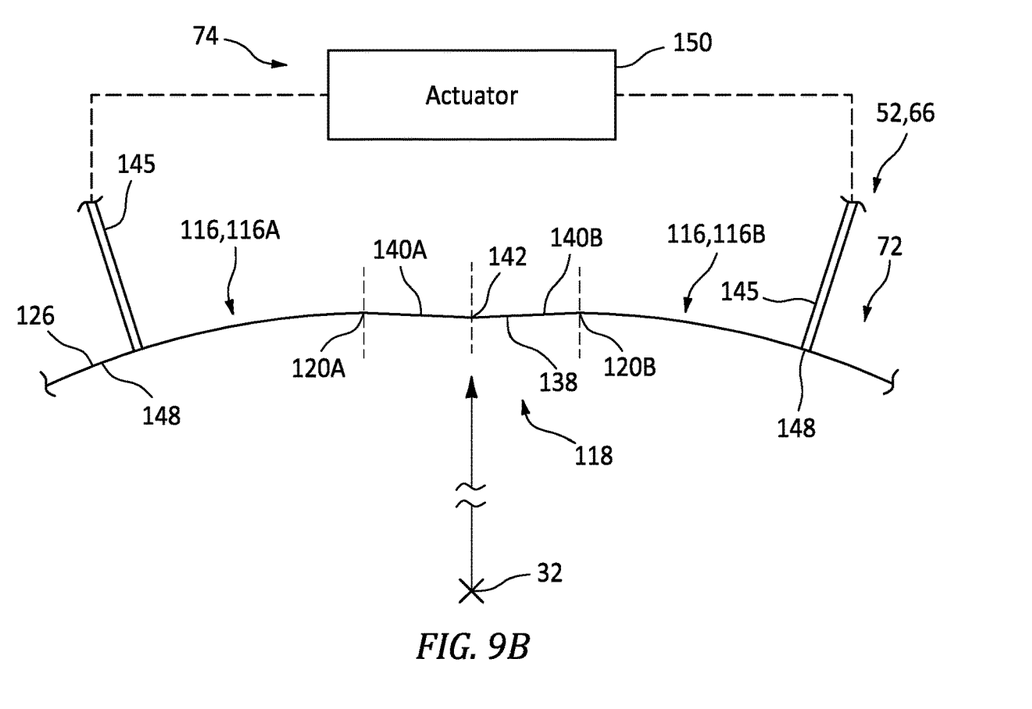
FIG. 9B is a schematic cross-sectional illustration of a portion of the outer skin where the variable area nozzle apparatus is in the unrestricted arrangement.
Figure 10A:
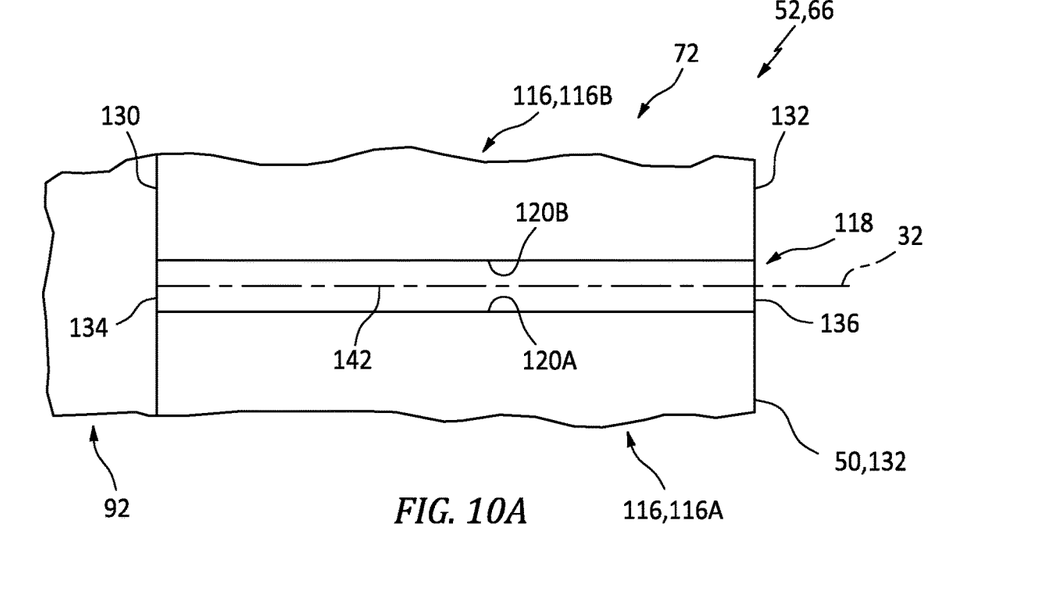
FIG. 10A is an illustration of an outer skin inter-panel member between adjacent outer skin panels and with the support member where the variable area nozzle apparatus is in the restricted arrangement.
Figure 10B:
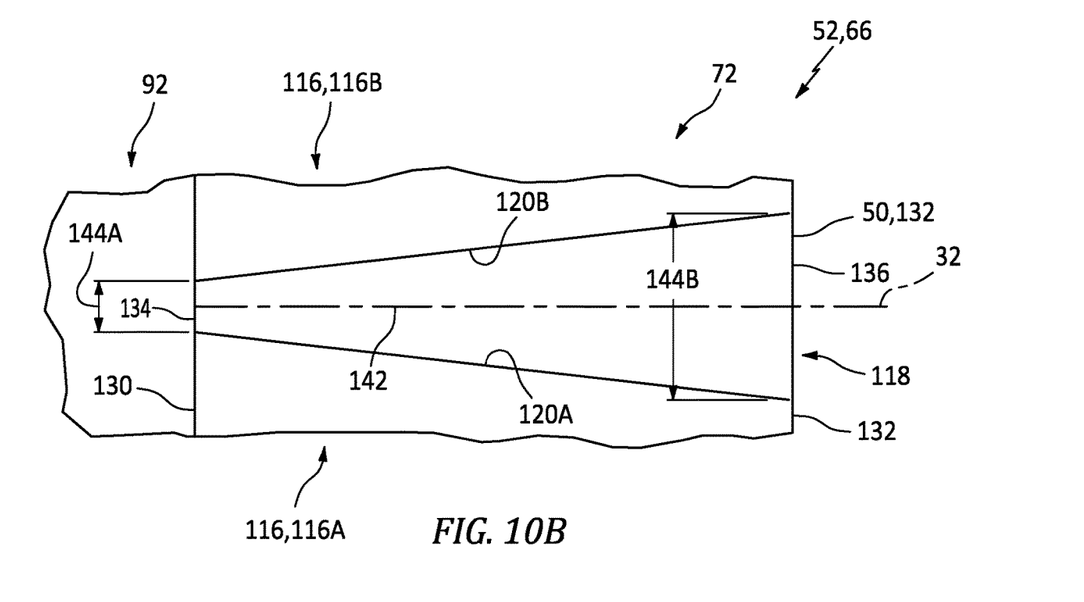
FIG. 10B is an illustration of the outer skin inter-panel member between adjacent outer skin panels and with the support member where the variable area nozzle apparatus is in the unrestricted arrangement.

Referring to FIGS. 9A and 9B, each of the outer skin inter-panel members 118 is configured to unfold, hinge and/or otherwise deform as the variable area nozzle apparatus 66 moves from its restricted flow arrangement (see FIG. 9A) to its unrestricted flow arrangement (see FIG. 9B). Each outer skin inter-panel member 118, for example, may be configured from or otherwise include a flexible material such as, but not limited to, an elastomeric material; e.g., rubber, etc.

In the restricted flow arrangement of FIG. 9A, each outer skin inter-panel member 118 is folded such that a first portion 140A of the respective outer skin inter-panel member 118 radially and longitudinally overlaps a second portion 140B of the respective outer skin inter-panel member 118. The outer skin inter-panel member first portion 140A is connected to a first of the outer skin panels (e.g., 116A). This outer skin inter-panel member first portion 140A projects (e.g., in a radial inward direction) out from the first outer skin panel 116A to an intermediate location 142 (or region) of the respective outer skin inter-panel member 118. The outer skin inter-panel member second portion 140B is connected to a second of the outer skin panels (e.g., 116B). This outer skin inter-panel member second portion 140B projects (e.g., in the radial inward direction) out from the second outer skin panel 116B to the intermediate location 142 (or region). The outer skin inter-panel member portions 140A and 104B meet one another at the intermediate location 142. The outer skin inter-panel member 118, for example, projects radially inward from the respective outer skin panels 116 to the intermediate location 142; e.g., a radial inboard edge. The outer skin inter-panel member 118 of FIG. 9A may thereby have a V-shaped or U-shaped cross-sectional geometry when viewed in the second reference plane.

In the unrestricted flow arrangement of FIG. 9B, each outer skin inter-panel member 118 is at least partially or completely unfolded. The outer skin inter-panel member first portion 140A of FIG. 9B, for example, projects laterally (e.g., not radially, or vary little radially) to the intermediate location 142. The outer skin inter-panel member second portion 140B similarly projects laterally (e.g., not radially, or vary little radially) to the intermediate location 142. The intermediate location 142, for example, may be radially aligned with the laterally adjacent outer skin panels 116. The outer skin inter-panel member first portion 140A and the outer skin inter-panel member second portion 140B may thereby extend substantially along a common arcuate reference line with the first outer skin panel 116A and the second outer skin panel 116B. Thus, the outer skin inter-panel member 118 of FIG. 9B may have an arcuate cross-sectional geometry when viewed in the second reference plane, which is a different cross-sectional geometry than when in the restricted flow arrangement of FIG. 9A.

As the outer skin 72 moves from the restricted flow arrangement of FIG. 9A to the unrestricted flow arrangement of FIG. 9B, a circumferential width of each outer skin inter-panel member 118 (e.g., at the downstream end or another reference point) increases. To facilitate this increase in the circumferential width, each outer skin inter-panel member 118 may be tapered as shown in FIG. 10B. A lateral width 144A of the outer skin inter-panel member 118 of FIG. 10B at its upstream end 134, for example, is smaller than a lateral width 144B of the outer skin inter-panel member 118 of FIG. 10B at its downstream end 136. This outer skin inter-panel member 118 of FIG. 10B thereby laterally tapers as the outer skin inter-panel member 118 extends longitudinally from its downstream end 136 to its upstream end 134.

Referring to FIGS. 2A and 2B, the actuation system 74 is configured to move the outer skin 72 by pivoting its outer skin panels 116 (see FIG. 3) radially inwards and radially outwards. The actuation system 74 of FIGS. 9A and 9B, for example, includes a plurality of outer linkages 145; e.g., arms, struts, links, etc. Each of these outer linkages 145 is mounted to a respective one of the outer skin panels 116. An end 148 of each outer linkage 145, for example, may be pivotally coupled to the respective outer skin panel 116 at a coupling location. This coupling location may be located intermediately (e.g., midway) between the sides 120A and 120B of the respective outer skin panel 116 and the connected outer skin inter-panel members 118. Another end of each outer linkage 145 may be motively coupled to an outer actuator 150; e.g., a motor, a linear actuator, etc. Each of the outer linkages 145 may be associated with its own respective outer actuator 150. Alternatively, one outer actuator 150 may be motively coupled to some or all of the outer linkages 145; e.g., through an intermediate coupling, etc. The present disclosure, however, is not limited to any particular actuation system configurations for moving the outer skin 72.

Figure 11:
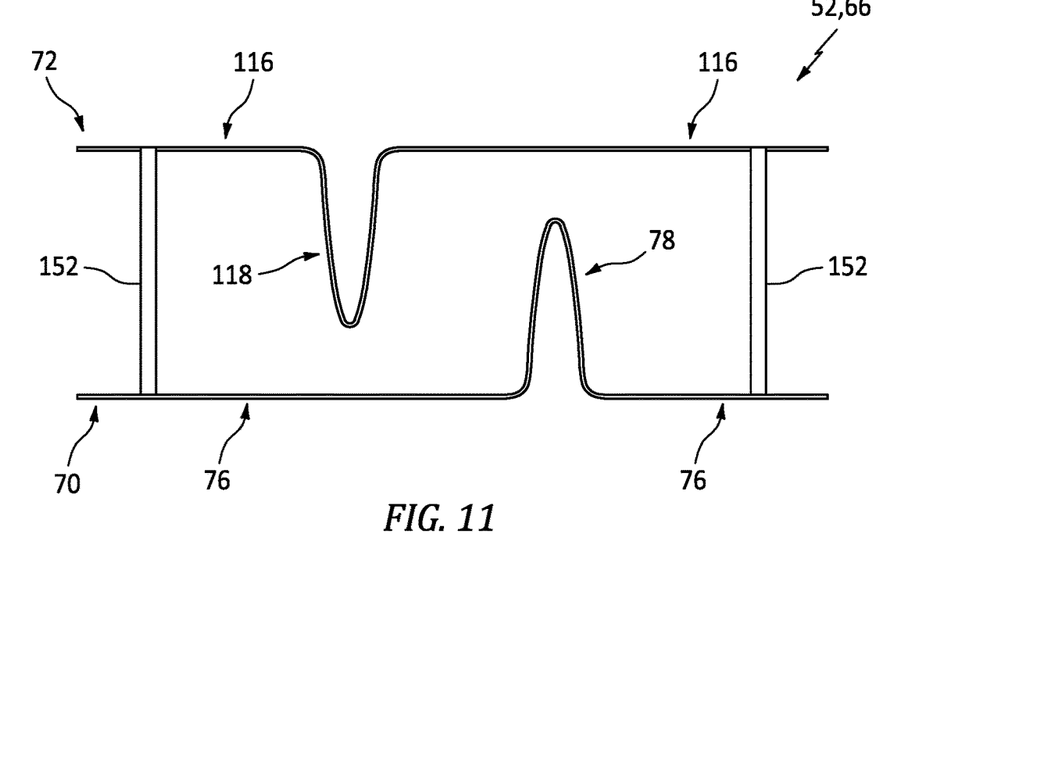
FIG. 11 is a sectional illustration of a portion of the variable area nozzle apparatus in the restricted arrangement.

In some embodiments, referring to FIG. 11, the inner skin inter-panel members 78 may be circumferentially offset from (e.g., staggered with) the outer skin inter-panel members 118. The inner skin inter-panel member 78 of FIG. 11, for example, is circumferentially spaced from a closest circumferentially neighboring one of the outer skin inter-panel members 118.

In some embodiments, the linkages 110, 145 and/or the actuator(s) 114, 150 of FIGS. 5A and 5B, 10A and 10B associated with the inner skin panels 76 or the outer skin panels 116 may be omitted. The variable area nozzle apparatus 66 of FIG. 11, for example, includes one or more inter-panel linkages 152, where each inter-panel linkage 152 couples movement of a respective one of the inner skin panels 76 with movement of a respective one of the outer skin panels 116.

In some embodiments, any one or more or all of the skin panels 76 and/or 116 may each be constructed from a fiber-reinforced composite. This fiber-reinforced composite includes fiber-reinforcement (e.g., carbon fibers, fiberglass fibers, aramid fibers, etc.) embedded within a polymer matrix; e.g., a thermoplastic or thermoset resin. The present disclosure, however, is not limited to such exemplary composite materials. For example, in other embodiments, any one or more or all of the skin panels may each be constructed from metal; e.g., sheet metal.

Figure 12:
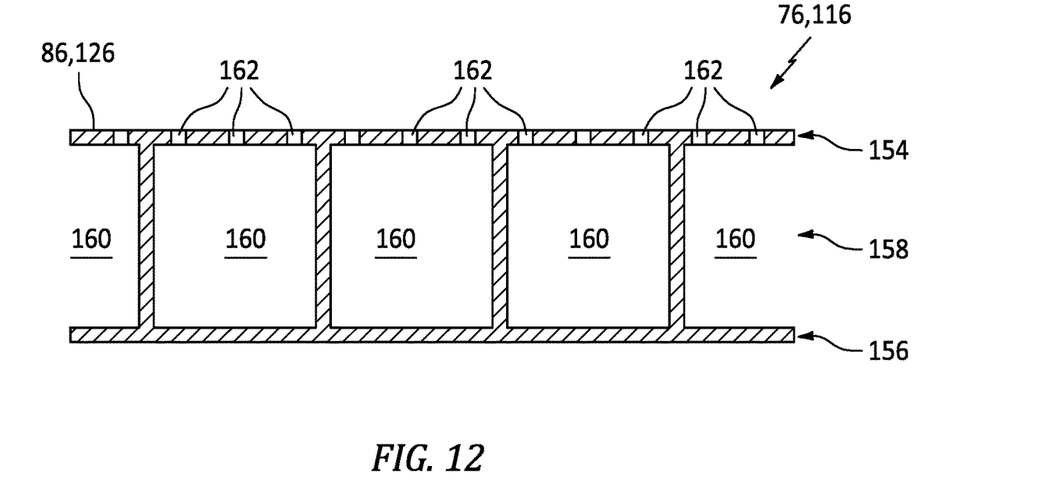
FIG. 12 is a sectional illustration of a portion of a variable area nozzle apparatus panel.

In some embodiments, referring to FIG. 12, any one or more or all of the skin panels 76 and/or 116 may each be configured for acoustic attenuation. The skin panel 76, 116 of FIG. 12, for example, includes a face skin 154, a back skin 156 and a cellular core 158 between and connected to the face skin 154 and the back skin 156. The face skin 154 may be perforated such that cavities 160 within the cellular core 158 are fluidly coupled with perforations 162 (e.g., through-holes, apertures, etc.) through the face skin 154. The face skin 154 may form the flow surface 86, 126 for the skin panel 76, 116. The back skin 156, by contrast, may be non-perforated.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
   a variable area nozzle apparatus including a plurality of panels, a plurality of inter-panel members, a plurality of outer panels, a plurality of outer inter-panel members and an actuation system;
   the plurality of panels arranged circumferentially about an axial centerline, and the plurality of panels including a first panel and a second panel;
   the plurality of inter-panel members arranged circumferentially about the axial centerline, the plurality of inter-panel members including a first inter-panel member between and connected to the first panel and the second panel, the first inter-panel member filling a gap laterally between a first side of the first panel and a second side of the second panel, and the first inter-panel member comprising an elastomeric material;
   the plurality of outer panels arranged circumferentially about the axial centerline and radially outboard of the plurality of panels, the plurality of outer panels including a first outer panel and a second outer panel;
   the plurality of outer inter-panel members arranged circumferentially about the axial centerline, the plurality of outer inter-panel members including a first outer inter-panel member between and connected to the first outer panel and the second outer panel, the first outer inter-panel member filling a gap laterally between a first side of the first outer panel and a second side of the second outer panel, and the first outer inter panel member comprising an elastomeric material; and
   the actuation system configured to move the plurality of panels and the plurality of inter-panel members between a restricted flow arrangement and an unrestricted flow arrangement;
   wherein the gap has a rectangular shape in a reference plane when the plurality of panels and the plurality of inter-panel members are in the restricted flow arrangement, and the gap has a trapezoidal shape in the reference plane when the plurality of panels and the plurality of inter-panel members are in the unrestricted flow arrangement; and
   wherein the first inter-panel member projects radially out from the first panel and the second panel when in the restricted flow arrangement, and the first outer inter-panel member projects radially in from the first outer panel and the second outer panel when in the restricted flow arrangement.

2. The apparatus of claim 1, wherein a cross-sectional area of an outlet from the variable area nozzle apparatus changes as the plurality of panels and the plurality of inter-panel members move between the restricted flow arrangement and the unrestricted flow arrangement.

3. The apparatus of claim 1, wherein an outlet from the variable area nozzle apparatus is formed by a trailing edge of the first panel and a trailing edge of the second panel.

4. The apparatus of claim 3, wherein the outlet from the variable area nozzle apparatus is further formed by a trailing edge of the first inter-panel member.

5. The apparatus of claim 1, wherein
   the first inter-panel member has a first sectional geometry when in the restricted flow arrangement; and
   the first inter-panel member has a second sectional geometry when in the unrestricted flow arrangement, and the second sectional geometry is different than the first sectional geometry.

6. The apparatus of claim 1, wherein the first inter-panel member is configured to at least partially unfold as the first inter-panel member moves from the restricted flow arrangement to the unrestricted flow arrangement.

7. The apparatus of claim 1, wherein a circumferential width of the first inter-panel member is configured to increase as the first inter-panel member moves from the restricted flow arrangement to the unrestricted flow arrangement.

8. The apparatus of claim 1, wherein
   the first inter-panel member extends axially along the axial centerline between a first end and a second end; and
   when in the unrestricted flow arrangement, a lateral width of the first inter-panel member at the first end is different than a lateral width of the first inter-panel member at the second end.

9. The apparatus of claim 1, wherein at least a portion of the first panel is configured for acoustic attenuation.

10. The apparatus of claim 1, wherein the first panel comprises a fiber-reinforced composite.

11. The apparatus of claim 1, wherein the first panel comprises an inner skin, an outer skin and a cellular core between and connected to the inner skin and the outer skin.

12. The apparatus of claim 1, further comprising:
    a support structure;
    each of the plurality of panels pivotally coupled to the support structure.

13. The apparatus of claim 1, wherein the first panel forms a flowpath surface radially inside of the variable area nozzle apparatus.

14. The apparatus of claim 1, wherein the first panel forms a flowpath surface radially outside of the variable area nozzle apparatus.

15. The apparatus of claim 1, wherein
    the actuation system includes a first linkage and a second linkage;
    the first linkage is coupled to the first panel; and
    the second linkage coupled to the second panel.

16. The apparatus of claim 1, wherein
    the actuation system includes a first linkage, a first actuator, a second linkage and a second actuator;
    the first linkage couples the first actuator to the first panel;
    the second linkage couples the second actuator to the second panel;
    the first actuator comprises a first motor; and
    the second actuator comprises a second motor.

17. The apparatus of claim 1, wherein
    the actuation system includes a first linkage, a first linear actuator, a second linkage and a second linear actuator;
    the first linkage couples the first actuator to the first panel; and the second linkage couples the second actuator to the second panel.

18. The apparatus of claim 1, wherein the actuation system is further configured to move the plurality of outer panels and the plurality of outer inter-panel members between a restricted flow arrangement and an unrestricted flow arrangement.

19. The apparatus of claim 1, wherein the first outer inter-panel member axially overlaps and circumferentially overlaps the first inter-panel member.

20. The apparatus of claim 1, wherein the first inter-panel member is aligned circumferentially between a circumferentially adjacent pair of the plurality of outer inter-panel members.

* * * * *